(12) United States Patent
Xiao et al.

(10) Patent No.: US 11,240,317 B2
(45) Date of Patent: Feb. 1, 2022

(54) DIAGNOSTIC METHOD AND SYSTEM FOR VEHICLE, AND RELATED DEVICE THEREOF

(71) Applicant: AUTEL INTELLIGENT TECHNOLOGY CORP., LTD., Guangdong (CN)

(72) Inventors: Jingling Xiao, Guangdong (CN); Guanyuan Liu, Guangdong (CN)

(73) Assignee: AUTEL INTELLIGENT TECHNOLOGY CORP., LTD., Shenzhen (CN)

( * ) Notice: Subject to any disclaimer, the term of this patent is extended or adjusted under 35 U.S.C. 154(b) by 0 days.

(21) Appl. No.: 17/034,074

(22) Filed: Sep. 28, 2020

(65) Prior Publication Data

US 2021/0014318 A1 Jan. 14, 2021

Related U.S. Application Data

(63) Continuation of application No. PCT/CN2019/079542, filed on Mar. 25, 2019.

(30) Foreign Application Priority Data

Apr. 4, 2018 (CN) .......................... 201810299918.9

(51) Int. Cl.
*H04L 29/08* (2006.01)
*G07C 5/00* (2006.01)
(Continued)

(52) U.S. Cl.
CPC ............ *H04L 67/141* (2013.01); *G07C 5/008* (2013.01); *G07C 5/0808* (2013.01); *H04L 67/12* (2013.01); *H04L 67/327* (2013.01); *H04L 67/42* (2013.01)

(58) Field of Classification Search
CPC ..... H04L 67/141; H04L 67/12; H04L 67/327; H04L 67/42; H04L 67/10; G07C 5/008; G07C 5/0808
See application file for complete search history.

(56) References Cited

U.S. PATENT DOCUMENTS

2002/0120536 A1* 8/2002 Maung .................. G06Q 30/02
705/35
2008/0320003 A1* 12/2008 Heinson ............. H04L 61/1511
(Continued)

FOREIGN PATENT DOCUMENTS

CN  101504661 A  8/2009
CN  101795286 A  8/2010
(Continued)

OTHER PUBLICATIONS

Chinese Office Action Application No. 2019092902062170; dated Oct. 9, 2019.
(Continued)

*Primary Examiner* — Austin J Moreau

(57) ABSTRACT

Embodiments of the present invention relate to the field of diagnostic technologies of a vehicle, and specifically disclose a diagnostic method for a vehicle. The method includes: receiving, by a diagnostic server, a connection request message sent by a terminal, the connection request message being used to request address information of a diagnostic server corresponding to a to-be-diagnosed vehicle; determining the corresponding diagnostic server according to the connection request message; and sending the address information of the diagnostic server to the terminal, so that the terminal establishes a communication connection with the diagnostic server according to the address information. According to the foregoing technical solutions, in the embodiments of the present invention, a (Continued)

plurality of vehicle can be diagnosed by using the terminal, improving diagnostic efficiency and achieving relatively high user experience.

10 Claims, 6 Drawing Sheets

(51) Int. Cl.
*G07C 5/08* (2006.01)
*H04L 29/06* (2006.01)

(56) References Cited

U.S. PATENT DOCUMENTS

| | | | |
|---|---|---|---|
| 2009/0300365 A1* | 12/2009 | Karmes | G06F 21/125 713/182 |
| 2011/0313950 A1* | 12/2011 | Nuggehalli | G06Q 30/0283 705/400 |
| 2013/0304306 A1 | 11/2013 | Selkirk et al. | |
| 2014/0121888 A1* | 5/2014 | Guo | G07C 5/008 701/31.4 |
| 2016/0071333 A1* | 3/2016 | Haidar | G07C 5/0808 701/29.3 |
| 2016/0381080 A1* | 12/2016 | Reddem | G06F 21/31 726/1 |

FOREIGN PATENT DOCUMENTS

| | | |
|---|---|---|
| CN | 101860493 A | 10/2010 |
| CN | 105450757 A | 3/2016 |
| CN | 108521459 A | 9/2018 |

OTHER PUBLICATIONS

International Search Report PCT/CN2019/079542; dated May 29, 2019.

* cited by examiner

DIAGNOSTIC METHOD AND SYSTEM FOR VEHICLE, AND RELATED DEVICE THEREOF This application is a continuation application of International Application No. PCT/CN2019/079542, filed on Mar. 25, 2019, which claims priority of Chinese Patent Application No. 201810299918.9, filed on Apr. 4, 2018, which is incorporated herein by reference in its entirety.

BACKGROUND

Technical Field

The present application relates to the field of diagnostic technologies for a vehicle, and in particular, to a diagnostic method and system for a vehicle and related devices thereof.

Related Art

With the improvement of the living standards, vehicles such as an automobile, a subway and a bullet train become necessary means for every family to travel. In recent years, rapid development of an electronic industry enables a contemporary vehicle to provide people with safer and more comfortable services. However, in the meantime, an electronic system inside the vehicle is becoming increasingly complex, bringing a new challenge for maintenance personnel of the vehicle.

Currently, to facilitate detection and maintenance of the vehicle, such as the automobile, a diagnostic terminal may diagnose a component inside the vehicle and an operating state of the vehicle by analyzing data of an electronic control unit (ECU) thereof.

However, because of limited diagnostic functions configured for the diagnostic terminal at present, how to use the diagnostic terminal to diagnose a plurality of vehicles becomes a subject actively researched by those skilled in the art.

SUMMARY

Based on the prior art, embodiments of the present invention provide a diagnostic method and system for a vehicle and related devices thereof, so that a diagnostic terminal may be used to diagnose a plurality of vehicles, improving diagnostic efficiency, and achieving relatively high user experience.

In particular, embodiments of the present invention provide technical solutions below:

In a first aspect, an embodiment of the present invention provides a diagnostic method for a vehicle, the method being applied to a management server and including:

receiving a connection request message sent by a terminal, the connection request message being used to request address information of a diagnostic server corresponding to a to-be-diagnosed vehicle;

determining the corresponding diagnostic server according to the connection request message; and sending the address information of the diagnostic server to the terminal, so that the terminal establishes a communication connection with the diagnostic server according to the address information.

In a second aspect, an embodiment of the present invention provides a diagnostic method for a vehicle, the method being applied to a terminal and including:

sending a connection request message to a management server, the connection request message being used to request address information of a diagnostic server corresponding to a to-be-diagnosed vehicle;

establishing a communication connection with the corresponding diagnostic server according to address information fed back by the management server for the connection request message; and receiving an operation instruction of a user, and sending the operation instruction to the diagnostic server, so that the diagnostic server responds to the operation instruction.

In a third aspect, an embodiment of the present invention provides a diagnostic method for a vehicle, the method being applied to a diagnostic server and including:

establishing a communication connection with a terminal; and receiving an operation instruction sent by the terminal, and responding to the operation instruction.

In a fourth aspect, an embodiment of the present invention provides a diagnostic apparatus for a vehicle, the apparatus being applied to a management server and including:

a connection request receiving unit, configured to receive a connection request message sent by a terminal, the connection request message being used to request address information of a diagnostic server corresponding to a to-be-diagnosed vehicle;

a determining unit, configured to determine the corresponding diagnostic server according to the connection request message; and an address sending unit, configured to send the address information of the diagnostic server to the terminal, so that the terminal establishes a communication connection with the diagnostic server according to the address information.

In a fifth aspect, an embodiment of the present invention provides a diagnostic apparatus for a vehicle, the apparatus being applied to a terminal and including:

a connection request sending unit, configured to send a connection request message to a management server, the connection request message being used to request address information of a diagnostic server corresponding to a to-be-diagnosed vehicle;

a first communication unit, configured to establish a communication connection with the corresponding diagnostic server according to address information fed back by the management server for the connection request message; and an operation instruction sending unit, configured to receive an operation instruction of a user, and send the operation instruction to the diagnostic server, so that the diagnostic server responds to the operation instruction.

In a sixth aspect, an embodiment of the present invention provides a diagnostic apparatus for a vehicle, the apparatus being applied to a diagnostic server and including:

a second communication unit, configured to establish a communication connection with a terminal; and a response unit, configured to receive an operation instruction sent by the terminal, and respond to the operation instruction.

In a seventh aspect, an embodiment of the present invention provides a management server, including:

at least one processor; and a memory communicatively connected to the at least one processor, where the memory stores an instruction executable by the at least one processor; and the at least one processor is configured to execute the instruction to implement the foregoing diagnostic method for a vehicle applied to a management server.

In an eighth aspect, an embodiment of the present invention provides a terminal, including:
at least one processor; and
a memory communicatively connected to the at least one processor, where
the memory stores an instruction executable by the at least one processor; and
the at least one processor is configured to execute the instruction to implement the foregoing diagnostic method for a vehicle applied to a terminal.

In a ninth aspect, an embodiment of the present invention provides a diagnostic server, including:
at least one processor; and
a memory communicatively connected to the at least one processor, where
the memory stores an instruction executable by the at least one processor; and
the at least one processor is configured to execute the instruction to implement the foregoing diagnostic method for a vehicle applied to a diagnostic server.

In a tenth aspect, an embodiment of the present embodiment provides a diagnostic system for a vehicle, the system including: a terminal, a management server and at least one diagnostic server, where
the terminal is connected to a to-be-diagnosed vehicle;
the management server is respectively connected to the terminal and the at least one diagnostic server;
the management server is configured to perform the foregoing diagnostic method for a vehicle applied to a management server;
the terminal is configured to perform the foregoing diagnostic method for a vehicle applied to a terminal; and
the diagnostic server is configured to perform the foregoing diagnostic method for a vehicle applied to a diagnostic server.

In an eleventh aspect, an embodiment of the present invention further provides a non-transitory computer-readable storage medium, where the non-transitory computer-readable storage medium stores a computer-executable instruction, the computer-executable instruction being used to cause a management server to perform the foregoing method.

In a twelfth aspect, an embodiment of the present invention further provides a non-transitory computer-readable storage medium, where the non-transitory computer-readable storage medium stores a computer-executable instruction, the computer-executable instruction being used to cause a terminal to perform the foregoing method.

In a thirteenth aspect, an embodiment of the present invention further provides yet another non-transitory computer-readable storage medium, where the non-transitory computer-readable storage medium stores a computer-executable instruction, the computer-executable instruction being used to cause a diagnostic server to perform the foregoing method.

Different from a situation in the prior art, beneficial effects of the embodiments of the present invention are below: In the diagnostic method and system for a vehicle, and related devices thereof according to the embodiments of the present invention, when several diagnostic servers that can diagnose different vehicles are constructed as a cloud diagnostic server cluster managed by the management server, and when the connection request message for a vehicle is sent by the terminal to the management server, the management server allocates the corresponding diagnostic server to the terminal based on the connection request message, and the diagnostic server is thus used to diagnose the vehicle, so that a repair factory does not need to purchase related diagnostic services from different manufacturers respectively or spend a large number of human and financial resources on analysis of and research on diagnostic protocols of various vehicles, and diagnosis of a plurality of vehicles may be implemented by using the terminal, improving diagnostic efficiency and greatly reducing economic costs of the repair factory for diagnosis of the vehicles. What's more, in the embodiments of the present invention, the repair factory may enjoy services of the diagnostic servers corresponding to different brands only through one user account (that is, a user account for logging in to client software of a cloud diagnostic system), which is operated easily and conveniently, facilitating improvement of user experience.

BRIEF DESCRIPTION OF THE DRAWINGS

To describe the technical solutions in the embodiments of the present invention more clearly, the following briefly describes the accompanying drawings required for describing the embodiments of the present invention. Obviously, the accompanying drawings in the following descriptions are merely some embodiments of the present invention, and a person of ordinary skill in the art may further obtain other accompanying drawings according to the accompanying drawings without creative efforts.

DETAILED DESCRIPTION

To make the objectives, technical solutions, and advantages of the present invention clearer and more comprehensible, the following further describes the present invention in detail with reference to the accompanying drawings and embodiments. It should be understood that the embodiments herein are provided for describing the present invention and not intended to limit the present invention.

It should be noted that, the features in the embodiments of the present invention may be combined with each other in the case of no conflict, and all fall within the protection scope of the present invention. In addition, although functional modules are divided in a schematic apparatus diagram, and a logical sequence is shown in a flowchart, the shown or described steps may be performed through a manner different from division of modules in the apparatus, or in a sequence different from that of the flowchart in some cases. Further, the terms "first", "second" and the like adopted in the present invention do not limit data and a performing sequence, and only distinguish the same item or similar items with a substantially same function and effect.

A diagnostic method for a vehicle according to the embodiments of the present invention may be implemented based on a diagnostic system (including a terminal, a management server and several diagnostic servers) for a vehicle according to the embodiments of the present invention. In the diagnostic method, a corresponding diagnostic server is assigned, through the management server, to a terminal that is performing diagnosis of a vehicle, and after a communication connection is established between the terminal and the diagnostic server, the diagnostic server is used to diagnose the vehicle, so that a plurality of vehicles can be diagnosed by using the terminal, improving diagnostic efficiency and achieving relatively high user experience.

In the embodiments of the present invention, the "vehicle" may be any vehicle having an electronic control unit (that is, an ECU), such as: an automobile, a subway and a bullet train. The "plurality of vehicles" refer to a vehicle with ECUs of different brands/models, which may be different types of vehicles, such as the automobile and subway; or may be vehicles of a same type but different brands, such as a Mercedes-Benz automobile and a BMW automobile. No specific limitation is imposed in the embodiments of the present invention.

The embodiments of the present invention are further described below with reference to the accompanying drawings.

It should be understood that, the embodiments provided in the present invention may be combined with each other to form a new implementation in the case of no conflict.

Embodiment 1

Figure 1:
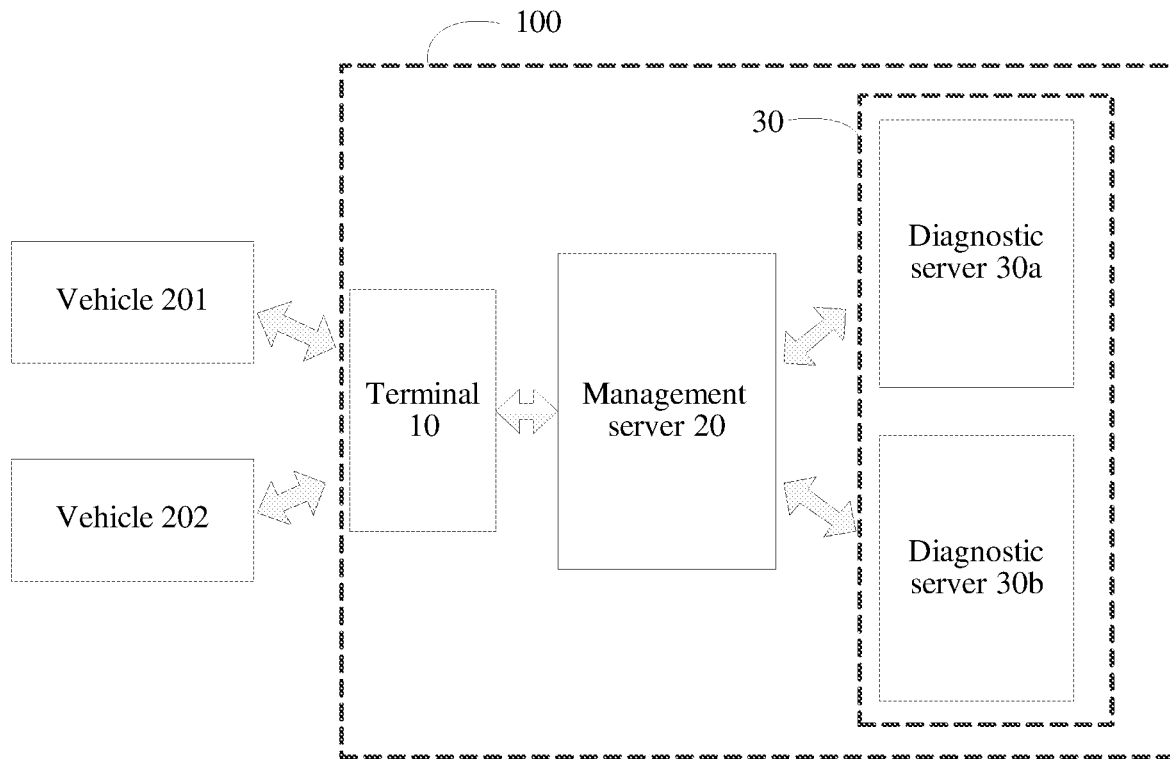
FIG. 1 is a schematic structural diagram of a diagnostic system for a vehicle according to an embodiment of the present invention.

FIG. 1 is a schematic structural diagram of a diagnostic system for a vehicle according to an embodiment of the present invention. A diagnostic system 100 for a vehicle is a running environment of a diagnostic method for a vehicle according to an embodiment of the present invention, and is configured to diagnose a to-be-diagnosed vehicle (201 or 202).

In particular, referring to FIG. 1, the diagnostic system 100 for a vehicle includes: one terminal 10, one management server 20 and two diagnostic servers 30 (that is, a diagnostic server 30a and a diagnostic server 30b). The two diagnostic servers 30 may diagnose two vehicles of ECUs with different brands. For example, the diagnostic server 30a may diagnose the vehicle 201, and the diagnostic server 30b may diagnose the vehicle 202.

The terminal 10 is communicatively connected to the to-be-diagnosed vehicle (201 or 202). The management server 20 is communicatively connected to the terminal 10 and the diagnostic server 20, respectively.

The terminal 10 may be any suitable type of electronic device having a certain logic operation capability and providing one or more functions that can meet a user's intention. For example, a personal computer, a tablet, a smartphone and a diagnostic robot. A user (for example, a repair technician, a car owner) may interact with the terminal 10 through any suitable type of one or more user interaction devices (such as a mouse, a keyboard, a remote control, a touch screen, a somatosensory camera and an audio acquisition apparatus), input an instruction, or control the terminal 10 to perform one or more operations. In addition, the terminal 10 may be in communication connection with the to-be-diagnosed vehicle 201 or 202 through any type of vehicle communication interface (VCI), on-board diagnostic (OBD) system, and the like, and read diagnostic data in an ECU of the vehicle 201 or 202 based on the communication connection. What's more, any type of client software, for example, a vehicle diagnostic APP, may be installed on the terminal 10. Through communication connection between the client software and the management server 20, a request message and a command are sent to the management server 20, and contents fed back by the management server 20 are received. Correspondingly, the management server 20 may process the request message or command sent by the terminal 10 and send a processing result to the corresponding terminal 10.

The management server 20 may serve as a central deployment center for allocating one or more diagnostic servers 30 requested by the terminal 10 to the terminal 10 when use of a diagnostic server 30 is requested at a terminal 10, so that the terminal 10 may diagnose the to-be-diagnosed vehicle by using the diagnostic server 30. In particular, the management server 20 may be a server, or a server cluster composed of several servers, or a cloud computing service center.

Diagnostic software that can diagnose a certain vehicle (or a certain ECU), such as original equipment manufacturer (OEM) software provided by an automobile manufacturer, is run in each diagnostic server 30. Diagnostic data of a corresponding vehicle (or ECU) may be analyzed and diagnosed through the diagnostic software. Each diagnostic server 30 may be communicatively connected to the management server 20 through a wired or wireless network, so that the management server 20 may deploy each diagnostic server 30 in real time and obtain an operating status of each diagnostic server 30. A plurality of diagnostic servers 30 may constitute a cloud diagnostic server cluster managed and deployed by the management server 20. In addition, each diagnostic server 30 is configured with a unique piece of address information (for example, an IP address), and a communication connection may be established between the terminal 10 and a corresponding diagnostic server 30 through a certain piece of address information.

Based on the foregoing diagnostic system 100 for a vehicle, in a practical application, when the vehicle 201 needs to be diagnosed, the user (the repair technician or the automobile owner) may first establish a communication connection between the vehicle 201 and the terminal 10 through an appropriate communication interface, and determine a model of the vehicle 201 and/or a diagnostic server (or diagnostic software) that may diagnose the model. Then, the user may interact with the terminal 10, log in client software that is in communication with the management server 20, and instruct the terminal 10 to send a connection request message to the management server 20. The connection request message is used to request address information of the diagnostic server corresponding to a model of the vehicle 201. After receiving the connection request message, the management server 20 may determine that the corresponding diagnostic server is the diagnostic server 30*a* according to the connection request message, and send address information of the diagnostic server 30*a* to the terminal 10. Further, a communication connection may be established between the terminal 10 and the diagnostic server 30*a* according to address information fed back by the management server 20 for the connection request message. Next, the user may input an operation instruction to the terminal 10. When receiving the operation instruction, the terminal 10 sends the operation instruction to the diagnostic server 30*a*. When receiving the operation instruction, the diagnostic server 30*a* responds to the operation instruction. After diagnosis of the vehicle 201 is completed, a communication connection between the terminal 10 and the diagnostic server 30*a* may be cut off.

Similarly, when the vehicle 202 needs to be diagnosed, the user may also establish a communication connection between the vehicle 202 and the terminal 10 through an appropriate communication interface, and determine a model of the vehicle 202 and/or a diagnostic server (or diagnostic software) that can perform diagnosis on the model. Afterwards, an interaction is performed with the terminal 10 and the terminal 10 is instructed to send a connection request message to the management server 20. The connection request message is used to request address information of a diagnostic server corresponding to the vehicle 202. After receiving the connection request message, the management server 20 may determine that the corresponding diagnostic server is the diagnostic server 30*b* according to the connection request message, and send address information of the diagnostic server 30*b* to the terminal 10. Further, a communication connection may be established between the terminal 10 and the diagnostic server 30*b* according to address information fed back by the management server 20 for the connection request message. Next, the user may input an operation instruction to the terminal 10. When receiving the operation instruction, the terminal 10 sends the operation instruction to the diagnostic server 30*b*. When receiving the operation instruction, the diagnostic server 30*b* responds to the operation instruction.

It should be noted that the diagnostic method for a vehicle and related apparatuses thereof according to the embodiment of the present invention may be further extended to other suitable implementation environments, which is not limited to the implementation environment shown in FIG. 1. Although only one terminal 10, one server 20, and two diagnostic servers 30 are shown in FIG. 1, those skilled in the art may understand that in a practical application process, the application environment may further include more or less terminal 10, server 20 and diagnostic server 30. In addition, to improve use efficiency, a plurality of different kinds of diagnostic software may be run in a same diagnostic server 30, or a same kind of diagnostic software may be run in a plurality of different diagnostic servers 30, which are not specifically limited in the embodiment of the present invention.

Embodiment 2

Figure 2:
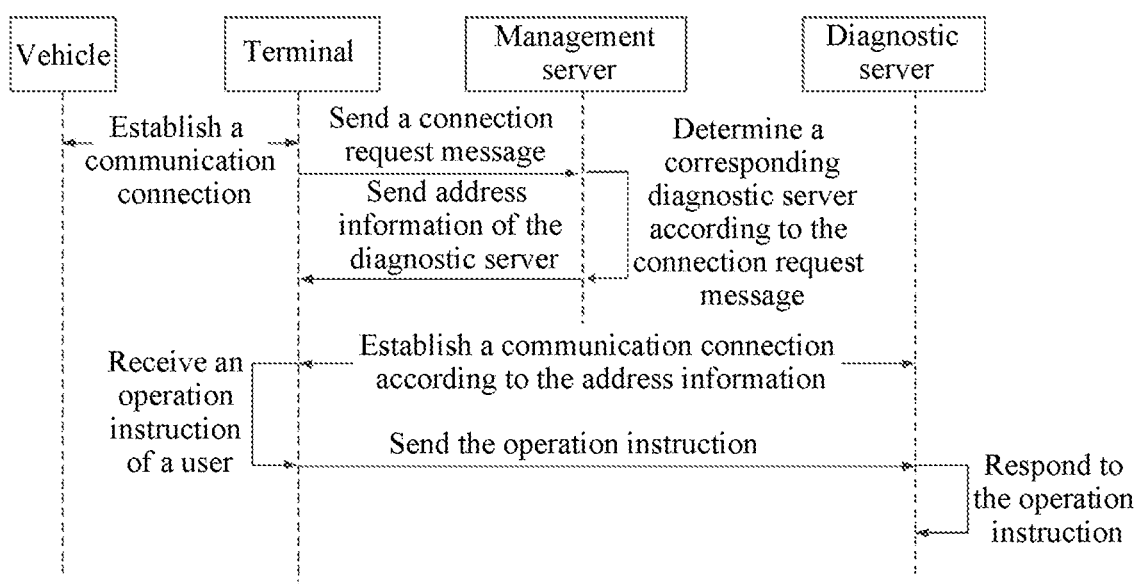
FIG. 2 is a first schematic interactive diagram of diagnosis of a vehicle according to an embodiment of the present invention by applying the diagnostic system for a vehicle shown in FIG. 1.

FIG. 2 is a first schematic interactive diagram of diagnosis of a vehicle according to an embodiment of the present invention by applying the diagnostic system for a vehicle shown in FIG. 1. Referring to FIG. 2, a method for a vehicle may include, but is not limited to, the following steps:

Step 11: a terminal sends a connection request message to a management server.

In this embodiment, the "connection request message" is used to request address information of a diagnostic server corresponding to a to-be-diagnosed vehicle. The "diagnostic server corresponding to a to-be-diagnosed vehicle" refers to a diagnostic server that can perform diagnosis on the to-be-diagnosed vehicle, and one or more pieces of diagnostic software that can perform diagnosis on the vehicle may be installed in the diagnostic server.

In a practical application, when a vehicle needs to be diagnosed, a communication connection between the vehicle and the terminal may be first established through VCI, OBD, and the like. Afterwards, the terminal reads information about the vehicle and automatically determines the diagnostic server corresponding to the vehicle. Subsequently, the user may instruct the terminal to send a connection request message for requesting address information of the diagnostic server corresponding to the vehicle to a management server.

Definitely, in some other application scenarios, the user may also directly input the diagnostic server corresponding to the to-be-diagnosed vehicle in client software, and instruct the terminal to send the connection request message to the management server.

Step 12: the management server receives a connection request message sent by the terminal, and determines a corresponding diagnostic server according to the connection request message.

In this embodiment, the "corresponding diagnostic server" refers to a diagnostic server to be requested by the terminal, that is, the "diagnostic server corresponding to the to-be-diagnosed vehicle" described in step 11, which may be determined according to the connection request message sent by the terminal.

To help the management server determine the diagnostic server to be requested by the terminal, in this embodiment, the "connection request message" may carry identifier information for determining the diagnostic server corresponding to the to-be-diagnosed vehicle. The identifier information may include, but is not limited to: a diagnostic server identifier, a vehicle identifier and a diagnostic software identifier. The "diagnostic server identifier" may be an identifier of a certain diagnostic server. When receiving a certain diagnostic server identifier, the management server may directly determine the corresponding diagnostic server. For example, if the management server receives the diagnostic server identifier of "diagnostic server A", it may be determined that the diagnostic server requested by the terminal is the diagnostic server A. The "vehicle identifier" may be any piece of information that may represent an attribute of the to-be-diagnosed vehicle. For example, the vehicle identifier may be any one or more of a VIN code, a manufacturer, a series and a model. The management server may match a corresponding diagnostic server for the vehicle based on received the vehicle identifier, for example, a diagnostic server corresponding to a brand "Benz" may be matched based on a vehicle identifier of "Benz Automobile", and one or more of kinds of diagnostic servers for diagnosing the Benz Automobile are installed in the diagnostic server. The "diagnostic software identifier" may be a unique identifier of a certain kind of diagnostic software. The diagnostic software may diagnose one or more vehicles including the to-be-diagnosed vehicle. Therefore, the management server may look for a diagnostic server including the diagnostic software identifier according to the received diagnostic software identifier, thereby determining a diagnostic server to be requested by the terminal.

Further, in some embodiments, to help more terminals use a diagnostic server corresponding to a same kind of vehicles at the same time, in the diagnostic system for a vehicle, a plurality of diagnostic servers are disposed for a same vehicle. Therefore, in the embodiment, that the management server determines the corresponding diagnostic server according to the connection request message may be specifically implemented below: first, according to the received identifier information, a diagnostic server cluster corresponding to the identifier information is determined; then, one diagnostic server is selected from the diagnostic server cluster. To reasonably allocate resources of the diagnostic server cluster and improve user experience, when a diagnostic server is selected from the diagnostic server cluster, whether there is an idle diagnostic server in the diagnostic server cluster may be looked for first. If yes, an idle diagnostic server is selected as a determined diagnostic server; if no, a prompt message such as "No idle diagnostic server at present, please wait" may be returned to the terminal, and at the same time, a running status of each diagnostic server in the diagnostic server cluster is continuously monitored, and an idle diagnostic server is waited. Alternatively, if no, a task load of each diagnostic server in the diagnostic server cluster may be further looked for, and one diagnostic server with the least task load may be selected as the determined diagnostic server.

In addition, in yet some embodiments, different permission levels are configured for different user accounts. Therefore, in the embodiment, the connection request message also includes user information acquired by the terminal. Therefore, in step 12, after receiving the connection request message sent by the terminal, the management server first determines, according to the user information in the connection request message, whether the terminal has connection request permission. If yes, a corresponding diagnostic server is determined according to the connection request message.

The determining whether the terminal has connection request permission refers to determining whether the terminal has permission to use a certain type of diagnostic server. During a specific implementation, according to the received user information, a user level may be determined, and then a type of the diagnostic server corresponding to the user level may be determined, and it may be further determined whether the diagnostic server requested by the terminal belongs to the type of diagnostic server corresponding to the user level. If yes, it means that the terminal has the connection request permission; if no, it means that the terminal does not have the connection request permission. Alternatively, in some other implementations, it may be determined whether the diagnostic server requested by the terminal is one of the diagnostic servers bound to the user information. If yes, it means that the terminal has the connection request permission; if no, it means that the terminal does not have the connection request permission.

Step 13: the management server sends the address information of the diagnostic server to the terminal.

In this embodiment, each diagnostic server is configured with a unique piece of address information, and a communication connection may be established between the terminal and the corresponding diagnostic server through a certain piece of address information. In particular, the address information may be an IP address of a diagnostic server.

In this embodiment, address information of all diagnostic servers may be pre-recorded in the management server. Therefore, when the management server determines a diagnostic server to be requested by a terminal, address information of the diagnostic server may be directly sent to the terminal, improving efficiency of establishing a communication connection between the terminal and the diagnostic server requested by the terminal.

Definitely, in some other embodiments, the management server may also be in communication with the diagnostic server after determining the diagnostic server to be requested by a terminal, obtain address information of the diagnostic server through feedback from the diagnostic server, and then send the address information to the terminal, which is not specifically limited in the embodiment of the present invention.

Step 14: a communication connection is established between the terminal and the corresponding diagnostic server according to the address information fed back by the management server for the connection request message.

In this embodiment, after acquiring, by the terminal, the address information fed back by the management server for the connection request message, a communication connection may be established between the terminal and the corresponding diagnostic server according to the address information. The establishing a communication connection may be performed in a manner below: the terminal directly accesses the address information, or the terminal sends a connection request to the address information, and after the corresponding diagnostic server is passed through, a communication connection is established.

Step 15: the terminal receives an operation instruction of a user, and sends the operation instruction to the diagnostic server.

In this embodiment, after a communication connection is established between the terminal and the diagnostic server, the user may remotely control the diagnostic server through performing a related operation on the terminal, and then diagnose the to-be-diagnosed vehicle by using the diagnostic software on the diagnostic server. Therefore, when receiving an operation instruction of the user, the terminal sends the operation instruction to the diagnostic server.

Step 16: the diagnostic server responds to the operation instruction.

In this embodiment, after the communication connection is established between the terminal and the diagnostic server, the diagnostic server receives an operation instruction sent by the terminal and responds to the operation instruction.

In some embodiments, that the diagnostic server receives an operation instruction sent by the terminal and responds to the operation instruction is specifically implemented below: the diagnostic server receives a first operation instruction sent by the terminal, and according to the first operation instruction, runs first diagnostic software corresponding to the first operation instruction. In the embodiment, the "first operation instruction" may be an "operation instruction for diagnosing a to-be-diagnosed vehicle by using the first diagnostic software" input by a user. When the diagnostic server receives the first operation instruction, the first diagnostic software may be run to diagnose the vehicle.

Alternatively, in some other embodiments, that the diagnostic server receives an operation instruction sent by the terminal and responds to the operation instruction is also specifically implemented below: the diagnostic server receives a second operation instruction sent by the terminal, and determine to-be-run second diagnostic software according to the second operation instruction; and when a third operation instruction sent by the terminal is received, the second diagnostic software is run. In the embodiment, the "second operation instruction" may be an instruction for pre-positioning one piece of certain diagnostic software (that is, the "second diagnostic software"), and the second operation instruction is used to indicate that the user needs to perform diagnosis on the to-be-diagnosed vehicle by using the diagnostic software. The "third operation execution" may be an operation instruction that is used to instruct a diagnostic terminal to run the second diagnostic software. In particular, when the diagnostic server receives the second operation instruction, the to-be-run second diagnostic software may be pre-determined. When the third operation instruction is received, the second diagnostic software may be run. In yet some embodiments, after the diagnostic server determines the to-be-run second diagnostic software, the second diagnostic software may be locked first to prevent other terminals from invoking the second diagnostic software at the same time and thus causing data confusion. It may be known from the foregoing technical solutions that beneficial effects of the embodiment of the present invention are below: In the diagnostic method for a vehicle according to the embodiment of the present invention, when several diagnostic servers that can diagnose vehicles of different models are constructed as a cloud diagnostic server cluster managed by the management server, and when the connection request message for a vehicle is sent by the terminal to the management server, the management server allocates the corresponding diagnostic server to the terminal based on the connection request message, and the diagnostic server is thus used to diagnose the vehicle, so that a repair factory does not need to purchase related diagnostic services from different manufacturers respectively or spend a large number of human and financial resources on analysis of and research on diagnostic protocols of various vehicles, and diagnosis of a plurality of vehicles may be implemented by using the terminal, improving diagnostic efficiency and greatly reducing economic costs of the repair factory for diagnosis of the vehicles. What's more, in the embodiments of the present invention, the repair factory may enjoy services of the diagnostic servers corresponding to a plurality of different brands only through one user account (that is, a user account for logging in to the client software), which is operated easily and conveniently, facilitating improvement of user experience.

Embodiment 3

Figure 3:
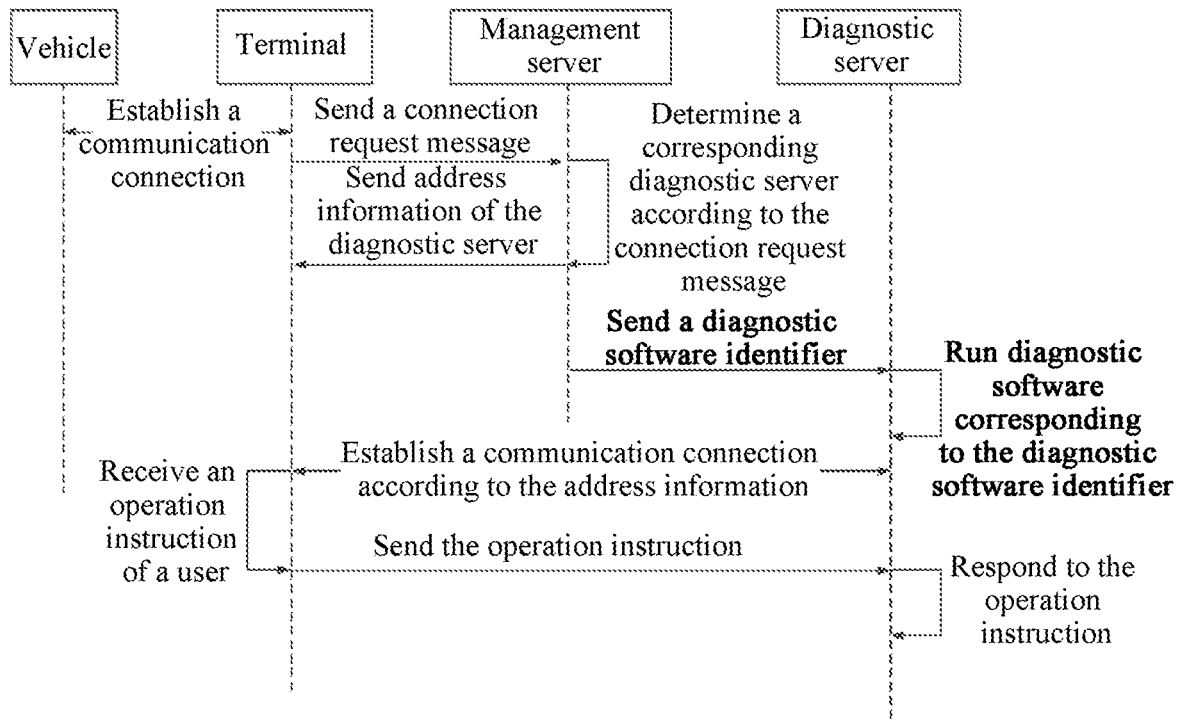
FIG. 3 is a second schematic interactive diagram of diagnosis of a vehicle according to an embodiment of the present invention by applying the diagnostic system for a vehicle shown in FIG. 1.

Based on the foregoing Embodiment 2, an embodiment of the present invention further provides a second diagnostic method for a vehicle by applying the diagnostic system for a vehicle shown in FIG. 1. In particular, as shown in FIG. 3, a difference between this embodiment and Embodiment 2 is below:

In this embodiment, the identifier information includes a diagnostic software identifier. When performing step 13, the management server further performs step 131: send the diagnostic software identifier to the diagnostic server. Correspondingly, after the diagnostic server receives the software identifier, step 132 is performed: run diagnostic software corresponding to the diagnostic software identifier.

In this embodiment, a connection request message sent by the terminal to the management server carries a diagnostic software identifier, indicating that the terminal determines the desired diagnostic software. Therefore, after the management server finally determines the corresponding diagnostic server, the management server sends the diagnostic software identifier to the diagnostic server while feeding address information of the diagnostic server back to the terminal, so that the diagnostic server runs diagnostic software corresponding to the diagnostic software identifier, and a running environment of the diagnostic server may be prepared. When a communication connection is established between the terminal and the diagnostic server, the diagnostic software may be directly invoked, thereby improving efficiency of diagnosis of the vehicle.

Embodiment 4

Figure 4:
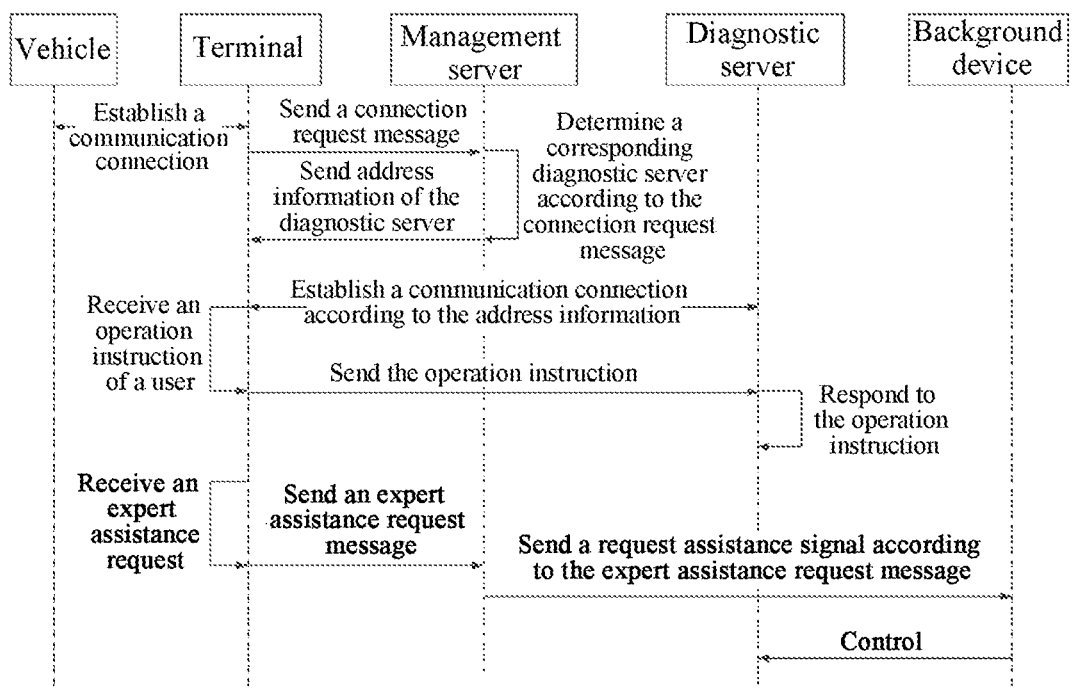
FIG. 4 is a third schematic interactive diagram of diagnosis of a vehicle according to an embodiment of the present invention by applying the diagnostic system for a vehicle shown in FIG. 1.

Based on the foregoing Embodiment 2, an embodiment of the present invention further provides a third diagnostic method for a vehicle by applying the diagnostic system for a vehicle shown in FIG. 1. In particular, as shown in FIG. 4, a difference between this embodiment and Embodiment 2 is below:

Considering that different users have different degrees of familiarity (or experience values) with vehicle diagnosis, some users (for example, automobile owners) may not know how to operate the diagnostic software to diagnose a vehicle. In this embodiment, an expert assistance diagnosis mode is further provided.

In particular, in this embodiment, when the terminal receives an expert assistance request, an expert assistance request message may be sent to the management server. Correspondingly, when the management server receives the expert assistance request message sent by the terminal, step 17 is performed: send a request assistance signal to a background device according to the expert assistance request message, the request assistance signal being used to request the background device to control the diagnostic server. The "background device" is a device operated by a maintenance expert, and the maintenance expert may control, through operating the background device, the diagnostic server to perform data interaction with the terminal.

In this embodiment, through setting up an expert service mode, more user demands may be met, and a more accurate diagnostic result may be provided.

Embodiment 5

Figure 5:
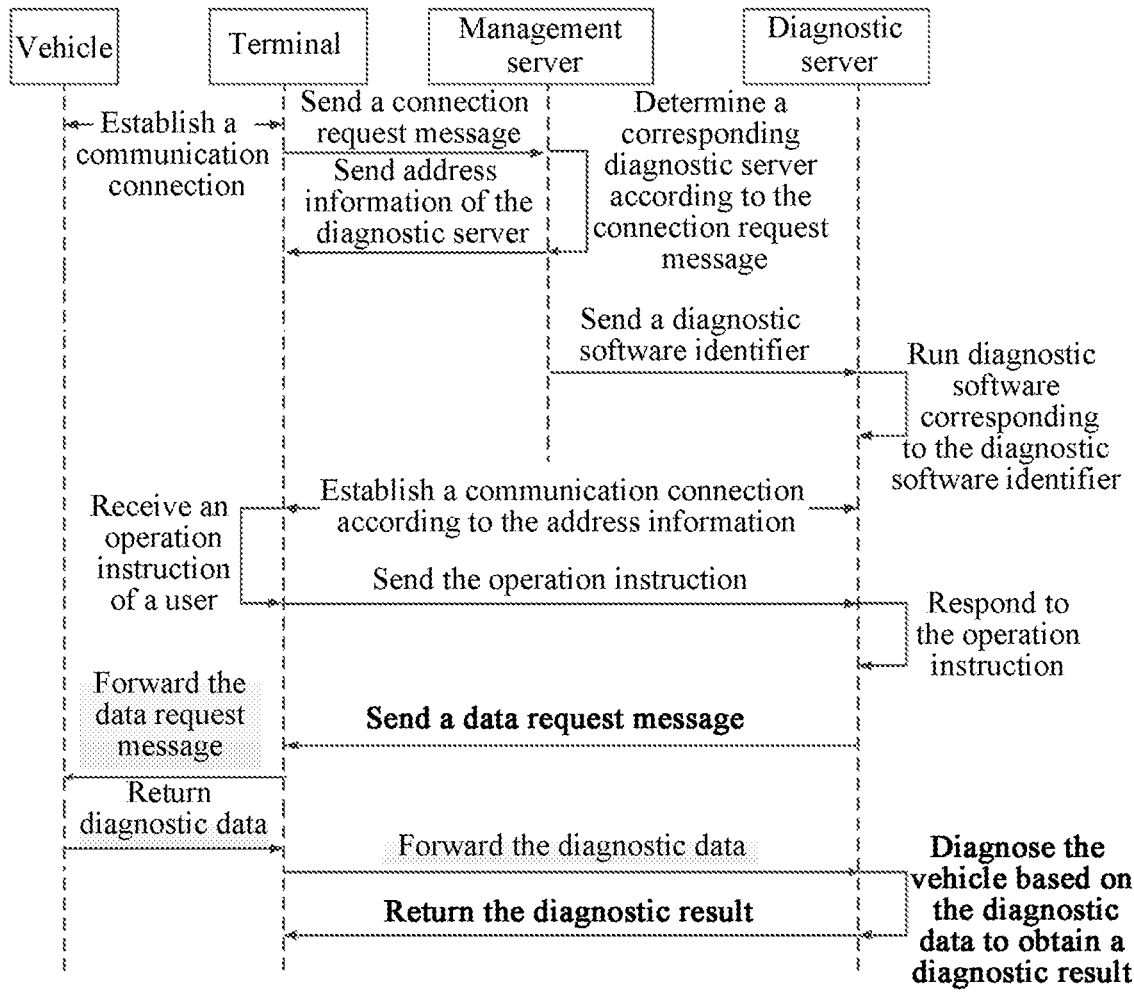
FIG. 5 is a fourth schematic interactive diagram of diagnosis of a vehicle according to an embodiment of the present invention by applying the diagnostic system for a vehicle shown in FIG. 1.

Based on the foregoing Embodiment 2, an embodiment of the present invention further provides a fourth diagnostic method for a vehicle by applying the diagnostic system for a vehicle shown in FIG. 1. In particular, as shown in FIG. 5, a difference between this embodiment and Embodiment 2 is below: In this embodiment, after a communication connection is established between the terminal and the diagnostic server, the following steps are further performed:

Step 21: the diagnostic server sends a data request message to the terminal, the data request message being used to request diagnostic data of the vehicle;

Step 22: the terminal sends the data request message to the vehicle;

Step 23: the vehicle returns diagnostic data thereof to the terminal;

Step 23: the terminal sends the diagnostic data to the diagnostic server;

Step 24: the diagnostic server diagnoses the vehicle based on the diagnostic data to obtain a diagnostic result;

Step 25: the diagnostic server returns the diagnostic result to the terminal.

In this embodiment, the diagnostic server can acquire the corresponding diagnostic data from the to-be-diagnosed vehicle through the terminal according to actual diagnosis demands, without analyzing a large amount of invalid diagnostic data, so that diagnosis efficiency of the vehicle may be improved.

Embodiment 6

Figure 6:
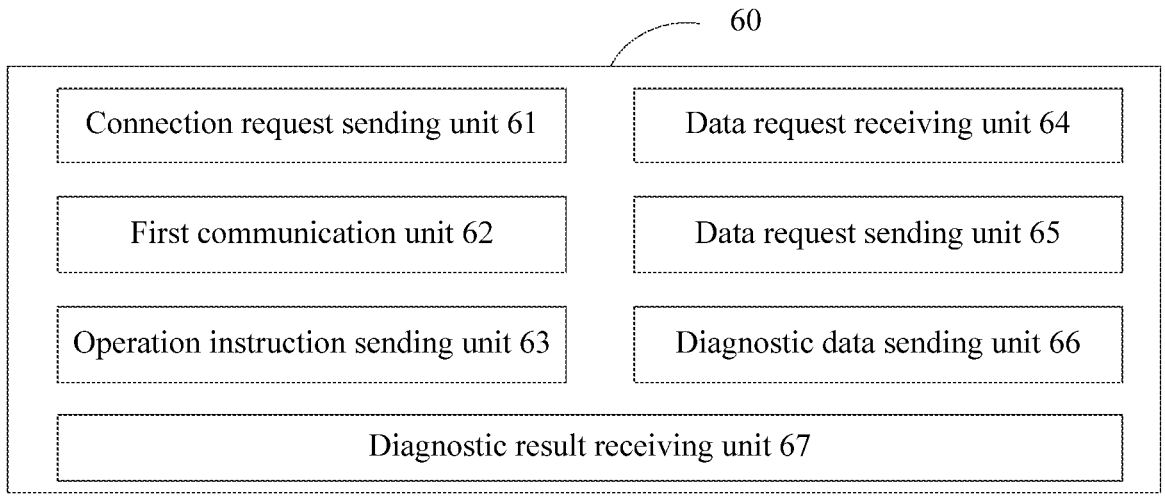
FIG. 6 is a schematic structural diagram of a diagnostic apparatus for a vehicle applied to a terminal according to an embodiment of the present invention.

FIG. 6 is a schematic structural diagram of a diagnostic apparatus for a vehicle applied to a terminal according to an embodiment of the present invention. Referring to FIG. 6, an apparatus 60 includes: a connection request sending unit 61, a first communication unit 62 and an operation instruction sending unit 63.

The connection request sending unit 61 is configured to send a connection request message to a management server, the connection request message being used to request address information of a diagnostic server corresponding to a to-be-diagnosed vehicle.

The first communication unit 62 is configured to establish a communication connection with the corresponding diagnostic server according to address information fed back by the management server for the connection request message.

The operation instruction sending unit 63 is configured to receive an operation instruction of a user, and send the operation instruction to the diagnostic server, so that the diagnostic server responds to the operation instruction.

In particular, in this embodiment, when a vehicle needs to be diagnosed, the connection request sending unit 61 of the apparatus 60 may send a connection request message to the management server, the connection request message being used to request address information of the diagnostic server corresponding to the to-be-diagnosed vehicle. Afterwards, the first communication unit 62 establishes a communication connection with the corresponding diagnostic server according to address information fed back by the management server for the connection request message. Finally, the operation instruction sending unit 63 receives an operation instruction of the user, and sends the operation instruction to the diagnostic server, so that the diagnostic server responds to the operation instruction.

In some embodiments, the apparatus 60 further includes: a data request receiving unit 64, a data request sending unit 65, a diagnostic data sending unit 66 and a diagnostic result receiving unit 67.

The data request receiving unit 64 is configured to receive a data request message sent by the diagnostic server, the data request message being used to request diagnostic data of the vehicle.

The data request sending unit 65 is configured to send the data request message to the vehicle, and receive the diagnostic data of the vehicle.

The diagnostic data sending unit 66 is configured to send the diagnostic data to the diagnostic server, so that the diagnostic server diagnoses the vehicle based on the diagnostic data to obtain a diagnostic result.

The diagnostic result receiving unit 67 is configured to receive the diagnostic result returned by the diagnostic server.

Figure 7:
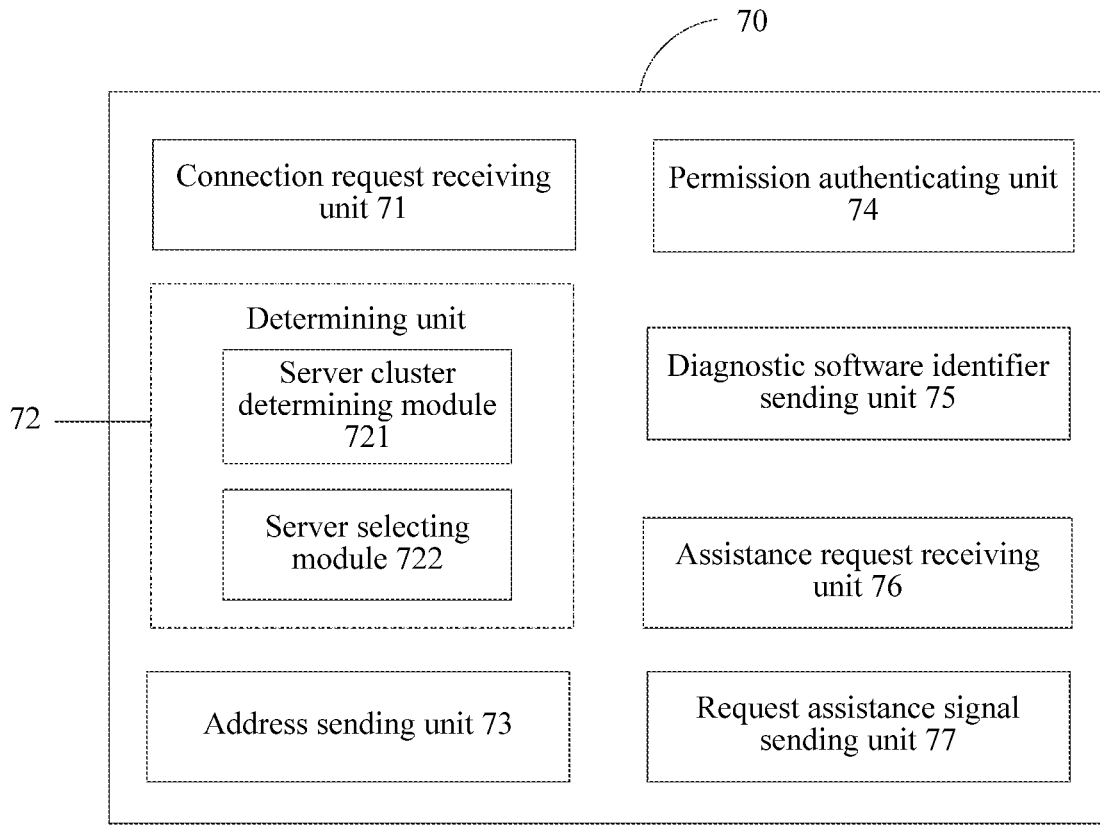
FIG. 7 is a schematic structural diagram of a diagnostic apparatus for a vehicle applied to a management server according to an embodiment of the present invention.

FIG. 7 is a schematic structural diagram of a diagnostic apparatus for a vehicle applied to a management server according to an embodiment of the present invention. Referring to FIG. 7, an apparatus 70 includes: a connection request receiving unit 71, a determining unit 72 and an address sending unit 73.

The connection request receiving unit 71 is configured to receive a connection request message sent by a terminal, the connection request message being used to request address information of a diagnostic server corresponding to a to-be-diagnosed vehicle.

The determining unit 72 is configured to determine the corresponding diagnostic server according to the connection request message.

The address sending unit 73 is configured to send the address information of the diagnostic server to the terminal, so that a communication connection is established between the terminal and the diagnostic server according to the address information.

In particular, in this embodiment, when the connection request receiving unit 71 receives a connection request message (the connection request message being used to request address information of a diagnostic server corresponding to a to-be-diagnosed vehicle) sent by the terminal, the determining unit 72 determines the corresponding diagnostic server according to the connection request message. Finally, the address sending unit 73 is configured to send the address information of the diagnostic server to the terminal, so that a communication connection is established between the terminal and the diagnostic server according to the address information.

In some embodiments, the connection request message includes user information acquired by the terminal. The apparatus 70 further includes: a permission authenticating unit 74. The permission authenticating unit 74 is configured to determine, according to the user information, whether the terminal has a connection request permission. If yes, the determining unit 72 determines the corresponding diagnostic server according to the connection request message.

In some embodiments, the connection request message carries identifier information, and the determining unit 72 includes: a server cluster determining module 721 and a server selecting module 722. The server cluster determining module 721 is configured to determine, according to the identifier information, a diagnostic server cluster corresponding to the identifier information. The server selecting module 722 is configured to select one diagnostic server from the diagnostic server cluster. Further, in yet some embodiments, the server selecting module 722 is specifically configured to: look for whether there is an idle diagnostic server in the diagnostic server cluster; if yes, select one idle diagnostic server.

In some embodiments, the identifier information includes a diagnostic software identifier, and the apparatus 70 further includes: a diagnostic software identifier sending unit 75.

The diagnostic software identifier sending unit 75 is configured to send the diagnostic software identifier to the diagnostic server, so that the diagnostic server runs diagnostic software corresponding to the diagnostic software identifier.

In some embodiments, the apparatus 70 further includes: an assistance request receiving unit 76 and a request assistance signal sending unit 77.

The assistance request receiving unit 76 is configured to receive an expert assistance request message sent by the terminal.

The request assistance signal sending unit 77 is configured to send a request assistance signal to a background device according to the expert assistance request message, the request assistance signal being used to request the background device to control the diagnostic server.

Figure 8:
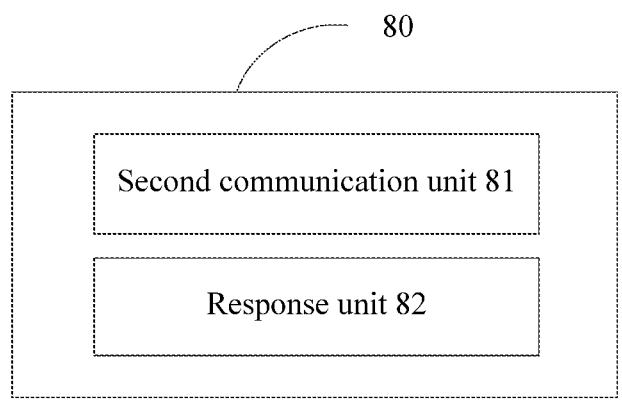
FIG. 8 is a schematic structural diagram of a diagnostic apparatus for a vehicle applied to a diagnostic server according to an embodiment of the present invention.

FIG. 8 is a schematic structural diagram of a diagnostic apparatus for a vehicle applied to a diagnostic server according to an embodiment of the present invention. Referring to FIG. 8, an apparatus 80 includes: a second communication unit 81 and a response unit 82.

The second communication unit 81 is configured to establish a communication connection with a terminal.

The response unit 82 is configured to receive an operation instruction sent by the terminal, and respond to the operation instruction.

In particular, in this embodiment, after a communication connection is established between the apparatus 80 and the terminal through the second communication unit 81, the apparatus 80 may, through the response unit 82, receive an operation instruction sent by the terminal and respond to the operation instruction.

In some embodiments, the response unit 82 is specifically configured to: receive a first operation instruction sent by the terminal, and run first diagnostic software corresponding to the first operation instruction according to the first operation instruction.

Alternatively, in some embodiments, the response unit 82 is specifically configured to:

receive a second operation instruction sent by the terminal, and determine to-be-run second diagnostic software according to the second operation instruction; and when a third operation instruction sent by the terminal is received, run the second diagnostic software.

It should be noted that, because the foregoing diagnostic apparatus for a vehicle and the diagnostic method for a vehicle described in the foregoing embodiments are based on a same inventive concept, corresponding contents and beneficial effects thereof in the foregoing method embodiment are also applicable to this apparatus embodiment and are not described in detail herein.

Embodiment 7

Figure 9:
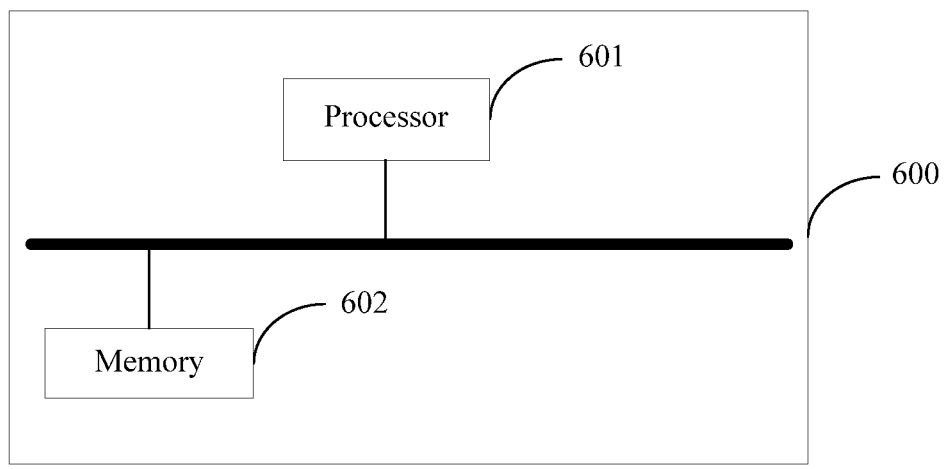
FIG. 9 is a schematic diagram of a hardware structure of a terminal according to an embodiment of the present invention.

FIG. 9 is a schematic diagram of a hardware structure of a terminal according to an embodiment of the present invention. A terminal 600 may be any type of electronic device, such as: a smartphone, a diagnostic robot, a personal computer and a tablet.

In particular, referring to FIG. 9, the terminal 600 includes:

one or more processors 601 and a memory 602. One processor 601 is used as an example in FIG. 9.

The processor 601 and the memory 602 may be connected through a bus or in other manners. In FIG. 9, that the processor and the memory are connected through a bus is used as an example.

The memory 602, as a non-transitory computer-readable storage medium, may be used to store a non-transitory software program, a non-transitory computer executable program and module, such as program instructions/modules (for example, the connection request sending unit 61, the first communication unit 62, the operation instruction sending unit 63, the data request receiving unit 64, the data request sending unit 65, the diagnostic data sending unit 66 and the diagnostic result receiving unit 67 shown in FIG. 6) corresponding to the diagnostic method for a vehicle applied to a terminal in the embodiments of the present invention. The processor 601 performs various functional applications and data processing of a diagnostic apparatus 60 for a vehicle applied to the terminal by running the non-transitory software program, instruction, and module stored in the memory 602, that is, implementing the diagnostic method for a vehicle applied to the terminal in any of the foregoing method embodiments.

The memory 602 may include a program storage area and a data storage area. The program storage area may store an operating system and an application program that is required for at least one function. The data storage area may store data and the like created according to the use of the diagnostic apparatus 60 for a vehicle applied to the terminal. In addition, the memory 602 may include a high-speed random-access memory, and may further include a non-transitory memory, such as at least one magnetic disk memory device, a flash memory device or other non-transitory solid-state memory devices. In some embodiments, the memory 602 may optionally include remotely disposed memories relative to the processor 601, these remote memories being connected to the terminal 600 via a network. An example of the foregoing network includes, but is not limited to, the Internet, an intranet, a local area network, a mobile communications network and a combination thereof.

The memory 602 stores an instruction that may be executed by the at least one processor 601. The at least one processor 601 is configured to execute the instruction to implement the diagnostic method for a vehicle applied to the terminal in any of the foregoing method embodiments, for example, performing the foregoing method steps 11, 14, 15, 22, 23, and the like, and implementing functions of units 61 to 67 in FIG. 6.

Further, an embodiment of the present invention further provides a non-transitory computer-readable storage medium. The non-transitory computer-readable storage medium stores a computer-executable instruction, the computer-executable instruction being executed by one or more processors, such as, being executed by one processor 601 in FIG. 9, so that the foregoing one or more processors 601 perform the diagnostic method for a vehicle applied to a terminal in any of the foregoing method embodiments, for example, performing the foregoing method steps 11 and 14, 15, 22, 23, and the like, and implementing functions of units 61 to 67 in FIG. 6.

Embodiment 8

Figure 10:
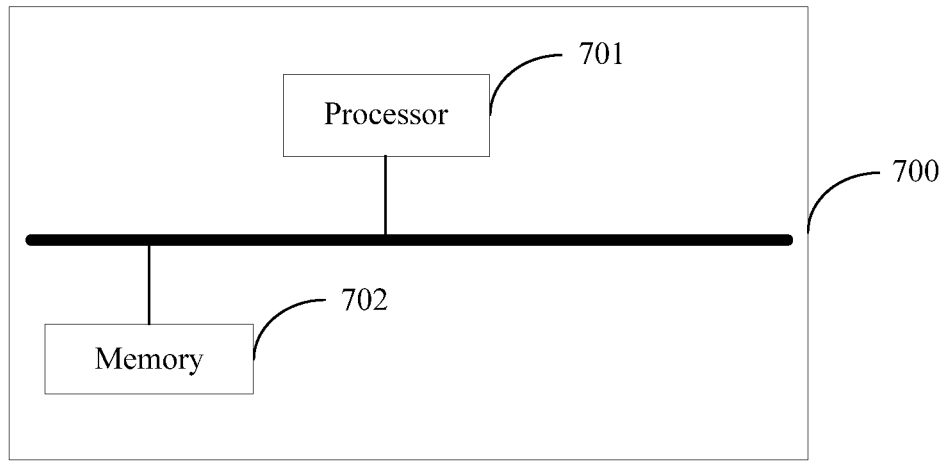
FIG. 10 is a schematic diagram of a hardware structure of a management server according to an embodiment of the present invention.

FIG. 10 is a schematic diagram of a hardware structure of a management server according to an embodiment of the present invention.

In particular, referring to FIG. 10, a management server 700 includes:

one or more processors 701 and a memory 702. One processor 701 is used as an example in FIG. 10.

The processor 701 and the memory 702 may be connected through a bus or in other manners. In FIG. 10, that the processor and the memory are connected through a bus is used as an example.

The memory 702, as a non-transitory computer-readable storage medium, may be used to store a non-transitory software program, a non-transitory computer-executable program and module, such as program instructions/modules (for example, the connection request receiving unit 71, the determining unit 72, the address sending unit 73, the permission authenticating unit 74, the diagnostic software identifier sending unit 75, the assistance request receiving unit 76 and the request assistance signal sending unit 77 shown in FIG. 7) corresponding to the diagnostic method for a vehicle applied to a management server in the embodiments of the present invention. The processor 701 performs various functional applications and data processing of the diagnostic apparatus 70 for a vehicle applied to the management server by running the non-transitory software program, instruction and module stored in the memory 702, that is, implementing the diagnostic method for a vehicle applied to the management server in any of the foregoing method embodiments.

The memory 702 may include a program storage area and a data storage area. The program storage area may store an operating system and an application program that is required for at least one function. The data storage area may store data and the like created according to the use of the diagnostic apparatus 70 for a vehicle applied to the management server. In addition, the memory 702 may include a high-speed random access memory, and may further include a non-transitory memory, such as at least one magnetic disk memory device, a flash memory device or other non-transitory solid-state memory devices. In some embodiments, the memory 702 may optionally include remotely disposed memories relative to the processor 701, these remote memories being connected to the management server 700 via a network. An example of the foregoing network includes, but is not limited to, the Internet, an intranet, a local area network, a mobile communications network and a combination thereof.

The memory 702 stores an instruction that may be executed by the at least one processor 701. The at least one processor 701 is configured to execute the instruction to implement the diagnostic method for a vehicle applied to the management server in any of the foregoing method embodiments, for example, performing the foregoing method steps, 12, 13, 131, 17, and the like, and implementing functions of units 71 to 77 in FIG. 7.

Further, an embodiment of the present invention further provides a non-transitory computer-readable storage medium. The non-transitory computer-readable storage medium stores a computer-executable instruction, the computer-executable instruction being executed by one or more processors, such as, being executed by one processor 701 in FIG. 10, so that the foregoing one or more processors 701 perform the diagnostic method for a vehicle applied to the management server in any of the foregoing method embodiments, for example, performing the foregoing method steps 12, 13, 131, 17, and the like, and implementing functions of units 71 to 77 in FIG. 7.

Embodiment 7

Figure 11:
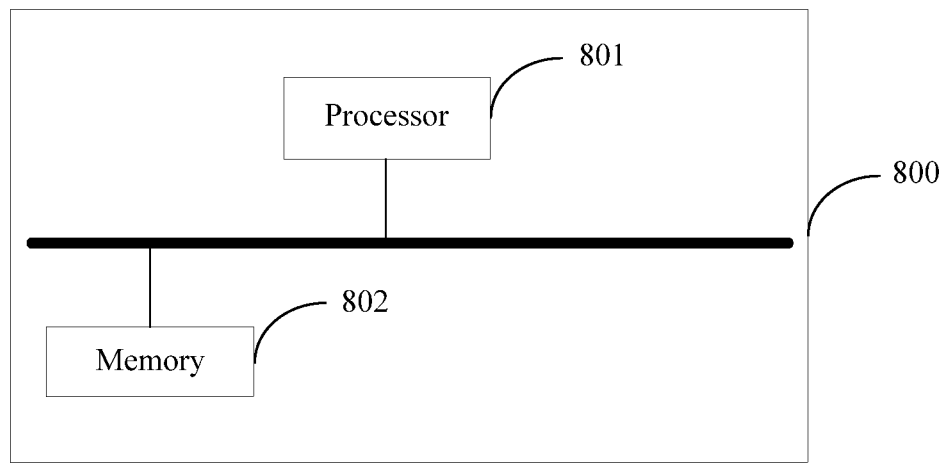
FIG. 11 is a schematic diagram of a hardware structure of a diagnostic server according to an embodiment of the present invention.

FIG. 11 is a schematic diagram of a hardware structure of a diagnostic server according to an embodiment of the present invention.

In particular, referring to FIG. 11, a diagnostic server 800 includes:

one or more processors 801 and a memory 802. One processor 801 is used as an example in FIG. 9.

The processor 801 and the memory 802 may be connected through a bus or in other manners. In FIG. 11, that the processor and the memory are connected through a bus is used as an example.

The memory 802, as a non-transitory computer-readable storage medium, may be used to store a non-transitory software program, a non-transitory computer-executable program and module, for example, a program instruction/module (such as the second communication unit 81 and the response unit 82 as shown in FIG. 8) corresponding to the diagnostic method for a vehicle applied to a diagnostic server in the embodiments of the present invention. The processor 801 performs various functional applications and data processing of a diagnostic apparatus 80 for a vehicle applied to the diagnostic server by running the non-transitory software program, instruction and module stored in the memory 802, that is, implementing the diagnostic method for a vehicle applied to the diagnostic server in any of the foregoing method embodiments.

The memory 802 may include a program storage area and a data storage area. The program storage area may store an operating system and an application program that is required for at least one function. The data storage area may store data and the like created according to the use of the diagnostic apparatus 80 for a vehicle applied to the diagnostic server. In addition, the memory 802 may include a high-speed random-access memory, and may further include a non-transitory memory, such as at least one magnetic disk memory device, a flash memory device or other non-transitory solid-state memory devices. In some embodiments, the memory 802 may optionally include remotely disposed memories relative to the processor 801, these remote memories being connected to the diagnostic server 800 via a network. An example of the foregoing network includes, but is not limited to, the Internet, an intranet, a local area network, a mobile communications network and a combination thereof.

The memory 802 stores an instruction that may be executed by the at least one processor 801. The at least one processor 801 is configured to execute the instruction to implement the diagnostic method for a vehicle applied to the diagnostic server in any of the foregoing method embodiments, for example, performing the foregoing method steps, 16, 132, 21, 24, 25, and the like, and implementing functions of units 81 to 82 in FIG. 8.

Further, an embodiment of the present invention further provides a non-transitory computer-readable storage medium. The non-transitory computer-readable storage m stores a computer-executable instruction, the computer-executable instruction being executed by one or more processors, such as, being executed by one processor 801 in FIG. 11, so that the foregoing one or more processors 801 perform the diagnostic method for a vehicle applied to the diagnostic server in any of the foregoing method embodiments, for example, performing the foregoing method steps 16, 132, 21, 24, 25, and the like, and implementing functions of units 81 to 82 in FIG. 8.

The apparatus embodiments described above are merely schematic. The units described as separate parts may be or may not be physically apart. The parts displayed as units may be or may not be physical units, in other words, may be located at a same place, or may be distributed onto a plurality of network units. Some or all modules thereof may be selected based on an actual requirement, to implement an objectives of the solution in this embodiment.

Through the description of the foregoing implementations, a person of ordinary skill in the art may clearly understand that the implementations may be implemented by software in combination with a universal hardware platform, and may certainly be implemented by hardware. A person of ordinary skill in the art may understand that all or some of the procedures of the methods of the foregoing embodiments may be implemented by a computer program in a computer program product instructing relevant hardware. The computer program may be stored in a non-transitory computer readable storage medium, and the computer program includes a program instruction. When executed by a related device, the program instruction may cause the related device to perform the procedures of the embodiments of the foregoing methods. The foregoing storage medium may include: a magnetic disk, an optical disc, a read-only memory (ROM), or a random access memory (RAM).

For the foregoing products, the diagnostic method for a vehicle provided according to the embodiments of the present invention may be performed, and corresponding functional modules and beneficial effects for performing the diagnostic method for a vehicle are provided. For technical details that are not described in detail in this embodiment, refer to the diagnostic method for a vehicle according to the embodiments of the present invention.

Finally, it should be noted that: the foregoing embodiments are merely intended for describing the technical solutions of the present invention rather than limiting the present invention. Based on the idea of the present invention, the technical features in the foregoing embodiments or different embodiments may be combined, the steps may be implemented in any order, and many other changes in the different aspects of the present invention as described above may exist. For brevity, such changes are not provided in the detailed descriptions. Although the present invention is described in detail with reference to the foregoing embodiments, those of ordinary skill in the art should understand that they can still make modifications to the technical solutions described in the foregoing embodiments or make equivalent substitutions to some technical features thereof, without departing from scope of the technical solutions of the embodiments of the present invention.

What is claimed is:

1. A management server, comprising:
   at least one processor; and
   a memory communicatively connected to the at least one processor, wherein the memory stores an instruction executable by the at least one processor;
   and the at least one processor is configured to execute the instruction to:
   receive a connection request message sent by a terminal, the connection request message being used to request address information of a diagnostic server corresponding to a to-be-diagnosed vehicle;
   determine the corresponding diagnostic server according to the connection request message;
   send the address information of the diagnostic server to the terminal, so that the terminal establishes a communication connection with the diagnostic server according to the address information;
   receive an expert assistance request message sent by the terminal when an expert assistance diagnosis mode is set in the terminal;
   send a request assistance signal to a background device according to the expert assistance request message causing a user of the background device to control the diagnostic server to perform data interaction with the terminal according to the request assistance signal.

2. The management server according to claim 1, wherein the connection request message comprises user information acquired by the terminal; and the at least one processor is further configured to execute the instruction to:
   determine, according to the user information, whether the terminal has connection request permission; and
   the determining the corresponding diagnostic server according to the connection request message comprises:
   if yes, determining the corresponding diagnostic server according to the connection request message.

3. The management server according to claim 1, wherein the connection request message carries identifier information, and the determining the corresponding diagnostic server according to the connection request message comprises:
   determining a diagnostic server cluster corresponding to the identifier information according to the identifier information; and
   selecting one diagnostic server from the diagnostic server cluster.

4. The management server according to claim 3, wherein the selecting one diagnostic server from the diagnostic server cluster comprises:
   looking for whether there is an idle diagnostic server in the diagnostic server cluster;
   if yes, selecting one idle diagnostic server.

5. The management server according to claim 3, wherein the identifier information comprises a diagnostic software identifier, and the at least one processor is further configured to execute the instruction to:
   send the diagnostic software identifier to the diagnostic server, so that the diagnostic server runs diagnostic software corresponding to the diagnostic software identifier.

6. A terminal, comprising:
   at least one processor; and
   a memory communicatively connected to the at least one processor, wherein the memory stores an instruction executable by the at least one processor; and
   the at least one processor is configured to execute the instruction to:
   send a connection request message to a management server, the connection request message being used to request address information of a diagnostic server corresponding to a to-be-diagnosed vehicle;
   establish a communication connection with the corresponding diagnostic server according to address information fed back by the management server for the connection request message;
   receive an operation instruction of a user, and sending the operation instruction to the diagnostic server, so that the diagnostic server responds to the operation instruction;
   send an expert assistance request message to the management server when an expert assistance diagnosis mode is set in the terminal;
   request the management server to send a request assistance signal to a background device according to the expert assistance request message; and
   perform data interaction with the diagnostic server, wherein a user of the background device controls the diagnostic server to perform the data interaction with the terminal according to the request assistance signal.

7. The terminal according to claim 6, wherein the at least one processor is further configured to execute the instruction to:
   receive a data request message sent by the diagnostic server, the data request message being used to request diagnostic data of the vehicle;
   send the data request message to the vehicle, and receiving the diagnostic data of the vehicle;
   send the diagnostic data to the diagnostic server, so that the diagnostic server diagnoses the vehicle based on the diagnostic data to obtain a diagnostic result; and
   receive the diagnostic result returned by the diagnostic server.

8. A diagnostic server, comprising:
   at least one processor; and
   a memory communicatively connected to the at least one processor, wherein the memory stores an instruction executable by the at least one processor; and
   the at least one processor is configured to execute the instruction to:
   establish a communication connection with a terminal according to address information provided by a management server to the terminal in response to receiving a connection request message from the terminal;
   receive an operation instruction sent by the terminal, and respond to the operation instruction; and wherein a user of a background device controls the diagnostic sever to perform data interaction with the terminal based on a request assistance signal sent to the background device by the management server in response to receiving an expert assistance request message sent by the terminal operating in an expert assistance diagnosis mode.

9. The diagnostic server according to claim 8, wherein the receiving an operation instruction sent by the terminal, and responding to the operation instruction comprises:

receiving a first operation instruction sent by the terminal, and running first diagnostic software corresponding to the first operation instruction according to the first operation instruction.

10. The diagnostic server according to claim 7, wherein the receiving an operation instruction sent by the terminal, and responding to the operation instruction comprises:

receiving a second operation instruction sent by the terminal, and determining to-be-run second diagnostic software according to the second operation instruction; and when a third operation instruction sent by the terminal is received, running the second diagnostic software.

\* \* \* \* \*